(12) United States Patent
Gibbs

(10) Patent No.: US 7,311,568 B2
(45) Date of Patent: Dec. 25, 2007

(54) AMPHIBIOUS VEHICLE

(76) Inventor: Alan Timothy Gibbs, 28 Albert Bridge House, 127 Albert Bridge Road, London (GB) SW11 4PL ( * ) Notice: Subject to any disclaimer, the term of this patent is extended or adjusted under 35 U.S.C. 154(b) by 0 days.

(21) Appl. No.: 10/526,726

(22) PCT Filed: Jul. 15, 2004

(86) PCT No.: PCT/GB2004/003069

§ 371 (c)(1),
(2), (4) Date: Sep. 28, 2005

(87) PCT Pub. No.: WO2005/014314

PCT Pub. Date: Feb. 17, 2005

(65) Prior Publication Data

US 2006/0148340 A1 Jul. 6, 2006

(51) Int. Cl.
*B60F 3/00* (2006.01)
(52) U.S. Cl. .............. 440/12.52; 280/43.23; 440/12.66; 114/344
(58) Field of Classification Search ........... 440/12.5, 440/12.52, 12.54, 12.66; 114/344
See application file for complete search history.

(56) References Cited

U.S. PATENT DOCUMENTS 2,893,019 A * 7/1959 Renfroe et al. ............ 114/344
3,755,838 A * 9/1973 Dunagan .................... 114/344
3,831,210 A * 8/1974 Ow ........................... 280/414.5
4,958,584 A   9/1990 Williamson

FOREIGN PATENT DOCUMENTS

| EP | 0970825 | 1/2000 |
| GB | 2372795 | 9/2002 |
| WO | WO 93/15923 | * 8/1993 |
| WO | PCT/WO95/23074 | 8/1995 |
| WO | PCT/WO02/44006 | 6/2002 |

* cited by examiner

Primary Examiner—Sherman Basinger
(74) Attorney, Agent, or Firm—Young Basile

(57) ABSTRACT

An amphibious vehicle wheel suspension includes upper and lower linkages, a road suspension device and a retraction device for moving the wheel between a protracted position for road use, and a retracted position for marine use. Suspension device can be operatively disconnected from the wheel and/or the linkages to allow for retraction and protraction. Retraction device may also be disconnected for road use. The disconnection mechanisms may comprise a ball and track mechanism, interlocking splines, interlocking teeth, or a pneumatic clutch. Also provided is a combination of splines for a suspension lever arm, and a pneumatic clutch for retraction arm. Suspension device may be connected to upper linkage. Coil, torsion bar, or hydropneumatic springs may be used.

32 Claims, 6 Drawing Sheets

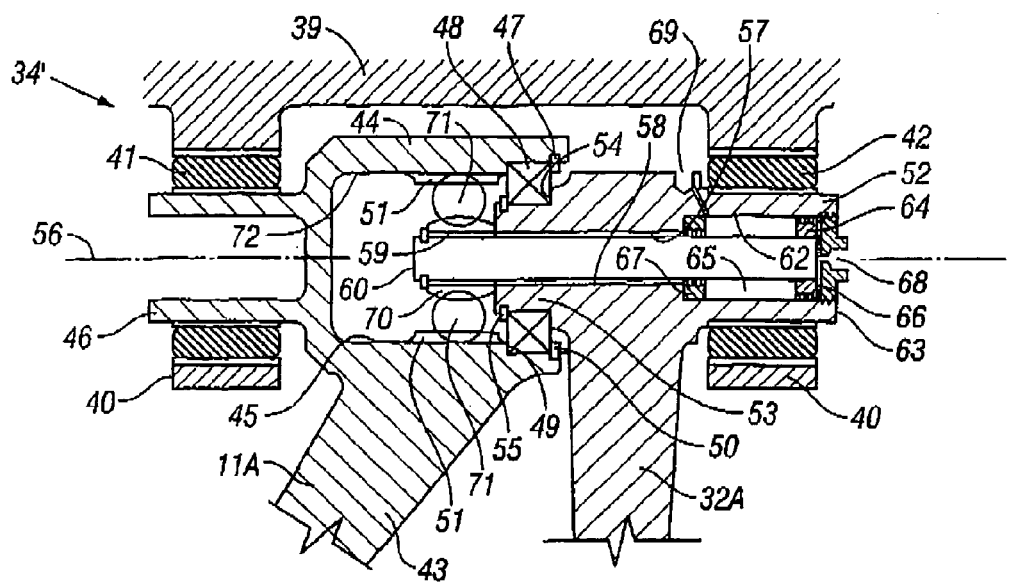
Fig.3
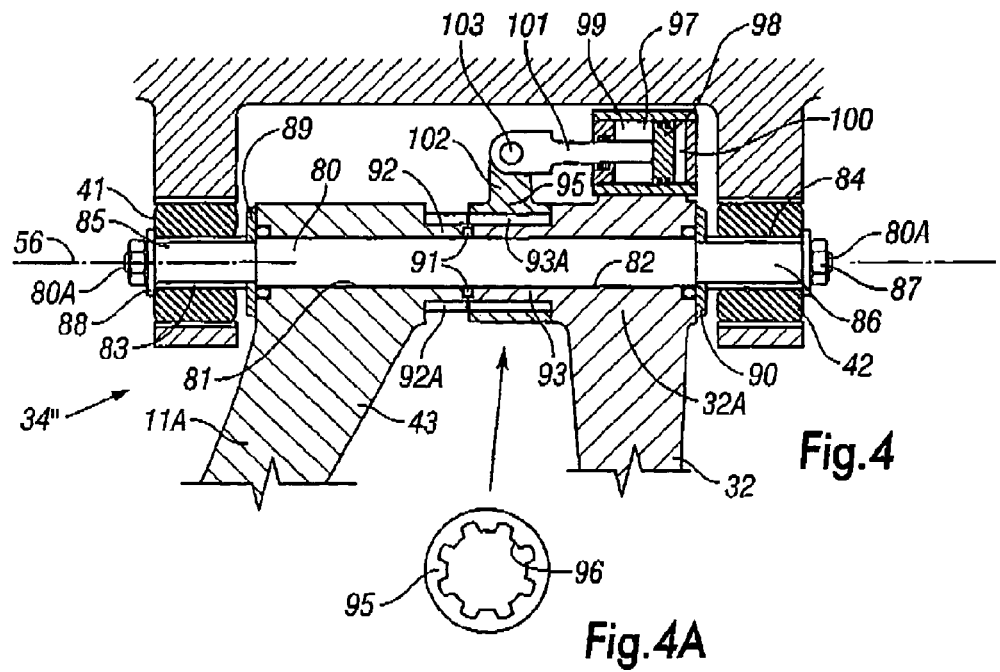
Fig.4
Fig.4A

AMPHIBIOUS VEHICLE

BACKGROUND OF THE INVENTION

The present invention relates to an amphibious vehicle.

Amphibious vehicles capable of powered travel on both land and water are known. In order to improve the performance of amphibious vehicles on water, various systems have been developed to allow the wheels to be retracted above the water line when the vehicle is water-borne. Such a system is known, for example, from the applicants' International patent application WO95/23074, which describes an apparatus that enables an axle-driven wheel to move between a protracted position, in which it has a substantially horizontal axis of rotation for support of the vehicle on land, and a retracted position, in which the axis of rotation of the wheel is at an angle greater than 45 degrees to the horizontal.

In a typical known retractable wheel arrangement, the wheel is mounted to the body of the vehicle by means of one or more suspension linkages which are configured to allow the wheel to move between the protracted and retracted positions. Normally an actuator, such a hydraulic strut or ram, will be operatively connected to one of the suspension linkages to move the wheel between the protracted and retracted positions. Also connected to one of the suspension linkages is a suspension means comprising springing and damping means for absorbing road shocks when the vehicle is used on land. Various types of suspension means have been proposed for use with the known retractable wheel apparatus, such as: coil spring and hydraulic damper struts, torsion bar and damper systems, and hydropneumatic suspension units.

A drawback with known retracting wheel arrangements is that the design of the suspension means may have to be compromised in order to allow the wheel to be retracted. For example, it may be necessary to design the suspension means so that it can be fully compressed when the wheel retracts or it may be necessary to alter the sizes and shapes of components to enable full retraction of the wheel to take place. As a result, it may be difficult and time consuming to tune the suspension characteristics of the vehicle for land use. For example, users of the vehicle will expect ride comfort characteristics on land which are comparable to those of a conventional land based motor vehicle.

A further drawback of some known wheel retraction arrangements is the amount of space required to accommodate movement of the suspension means as the wheel moves between its protracted and retracted positions. U.S. Pat. No. 4,958,584, for example, describes an amphibious vehicle having a wheel retraction arrangement in which the wheel is attached to the vehicle body using a wishbone type suspension. A suspension means in the form of a strut having a coil spring located about a telescopic hydraulic damper is connected between an upper wishbone and part of the wheel retraction system. To move the wheel to the retracted position, the upper end of the strut is drawn inwardly. This arrangement takes up a considerable amount of space in a central area of the vehicle making it unsuitable for use with a compact amphibious vehicle. The problem is most acute where the engine and transmission are mounted between a pair of retractable road wheels, as there is little space available into which the struts for those wheels can be drawn.

SUMMARY OF THE INVENTION

It is an object of the invention to provide an amphibious vehicle having a retractable wheel arrangement in which the characteristics of the suspension means can be more easily optimised for road use.

It is a further object of the invention to provide an amphibious vehicle having a retractable wheel arrangement in which less space is required to allow movement of the wheel between its protracted and retracted positions.

It is yet a further object of the invention to provide an amphibious vehicle having a retractable wheel arrangement where the suspension spring does not have to be compressed in order to retract the suspension.

In accordance with the invention, there is provided an amphibious vehicle having a wheel mounted to a body of the vehicle so as to be movable from a protracted position, for use of the vehicle on land, to a retracted position, in which the wheel is stowed for use of the vehicle on water, the vehicle further comprising a suspension means to absorb shocks from the wheel during land use and a retraction means for moving the wheel between the protracted and retracted positions, characterised in that the suspension means can be operatively disconnected from the wheel when the wheel is to be retracted.

Because the suspension means can be operatively disconnected from the wheel, the suspension means can be tuned to provide optimum road or land use characteristics without having to compromise the design to enable the wheel to be retracted. Furthermore, because the suspension means is disconnected from the wheel, it can remain in its land use position when the wheel is retracted, eliminating the need to allow space to accommodate movement of the suspension means as the wheel is retracted.

Preferably, the retraction means can be operatively disconnected from the wheel when the wheel is in the protracted position.

In a particularly preferred embodiment, the wheel is mounted to the body of the vehicle by means of one or more suspension linkages and the vehicle further comprises suspension disconnect apparatus for operatively connecting the suspension means to, or operatively disconnecting the suspension means from, one of the suspension linkages.

Preferably, the suspension means is operatively connected to one end of a suspension lever arm, the other end of the suspension lever arm being operatively connectable to said one of the suspension linkages by the suspension disconnect apparatus.

Preferably, the said one of the suspension linkages and the retraction lever arm are mounted to the vehicle body for pivotal movement relative to the body about an axis and the suspension disconnect apparatus comprises means movable between a first position, in which the said one of the suspension linkages and the suspension lever arm are locked so as to pivot together about the axis, and a second position, in which the said one of the suspension linkages and the suspension lever arm are free to pivot about the axis relative to one another.

In one preferred embodiment, the suspension disconnect apparatus comprises a bore in the said one of the suspension linkages or in the suspension lever arm, the bore having a number of ball receiving tracks formed over a part of its length, a shaft slidably mounted to the other of the said one of the suspension linkages or the suspension lever arm, the shaft projecting into the bore and having a knuckle about which are mounted a plurality of balls, the shaft being movable from a first position in which the balls are engaged in the tracks to lock the said one of the suspension linkages and the suspension lever arm together for pivotal movement about the axis and a second position in which the balls are not engaged in the tracks and the said one of the suspension linkages and the other end of the suspension lever arm are free to pivot about the axis relative to one another.

Preferably, the suspension disconnect apparatus comprises an actuator, which may be an hydraulic actuator, to move the shaft between the first and second positions.

In an alternative embodiment, the said one of the suspension linkages and the suspension lever arm have adjacent drive portions and the suspension disconnect apparatus further comprises a sleeve having drive means for cooperation with corresponding drive means on the drive portions, the sleeve being movable from a first position in which it is in driving cooperation with both of the drive portions to lock the said one of the suspension linkages and the suspension lever arm together for pivotal movement about the axis, and a second position in which it is in driving cooperation with only one of the drive portions such that the linkage and the arm are free to pivot about the axis relative to one another.

Preferably, the sleeve is internally splined for engagement with corresponding splines formed on the drive portions. Alternatively, a bore of the sleeve may have a non-circular cross section for driving engagement with correspondingly shaped profiles on the drive portions.

Preferably, the suspension disconnect apparatus comprises an actuator, which may be an hydraulic actuator, to move the sleeve between the first and second positions.

In a yet further preferred embodiment, the said one of the suspension linkages and the suspension lever arm have corresponding drive teeth and the suspension lever arm is movable between a first position in which the drive teeth are engaged so as to lock the said one of the suspension linkages and the suspension lever arm together for pivotal movement about the axis, and a second position in which the drive teeth are disengaged such that the said one of the suspension linkages and the suspension lever arm are free to pivot about the axis relative to one another.

Preferably, the suspension disconnect apparatus comprises an actuator, which may be a hydraulic actuator, to move the suspension lever arm between the first and second positions.

Preferably, the vehicle further comprises a retraction disconnect apparatus for operatively connecting the retraction means to, or operatively disconnecting the retraction means from, one of the suspension linkages.

Preferably, the retraction means comprises a retraction actuator operatively connected to one end of a retraction lever arm, the other end of the retraction lever arm being connectable to said one of the suspension linkages through the retraction disconnect apparatus.

Preferably, the said one of the suspension linkages and the retraction lever arm are mounted to the vehicle body for pivotal movement relative to the vehicle body about an axis, the retraction disconnect apparatus comprising means for locking the said one of the suspension linkages and the retraction lever arm together for pivotal movement about the axis.

Advantageously, the retraction disconnect apparatus comprises a pneumatic clutch.

In one preferred embodiment, the clutch connects the said one of the suspension linkages and the retraction lever arm such that when the clutch is engaged the said one of the suspension linkages and the retraction lever arm are locked together for pivotal movement about the axis and that when the clutch is disengaged, the said one of the suspension linkages and the retraction lever arm are free to rotate about the axis relative to one another.

In an alternative embodiment, the said one of the suspension linkages is rotationally fast with a shaft, the pneumatic clutch having a first component which is also rotationally fast with the shaft and a second component attached so as to be rotationally fast with the retraction lever arm, the clutch being adapted such that when it is engaged the first and second components are rotationally fast so as to lock the said one of the suspension linkages and the retraction lever arm together for pivotal movement about the axis.

Preferably, the wheel is connected to the vehicle body by an upper suspension linkage and a lower suspension linkage.

Preferably, the suspension means is connectable to the upper suspension linkage. Alternatively, the suspension means is connectable to the lower suspension linkage.

Preferably, the retraction means is connectable to the lower suspension linkage.

Preferably, the suspension means comprises a strut having a coil spring mounted about a telescopic hydraulic damper.

Preferably, the retraction means comprises a double acting fluid ram. Alternatively, the retraction means may be in the from of a electrically driven ram.

BRIEF DESCRIPTION OF THE DRAWINGS

Several embodiments of an amphibious vehicle in accordance with the invention will now be described, by way of example only, with reference to the following drawings in which:

FIG. 3 is a cross-sectional view taken on line A-A of FIG. 2, showing a first embodiment of a suspension disconnect apparatus of the apparatus of FIG. 2;

FIG. 4 is a view similar to that of FIG. 3 but showing a second embodiment of a suspension disconnect apparatus of the apparatus of FIG. 2;

FIG. 4A is an inset view showing in cross section a splined collar forming part of the second embodiment of the suspension disconnect apparatus;

DETAILED DESCRIPTION OF THE PREFERRED EMBODIMENT

Figure 1A:
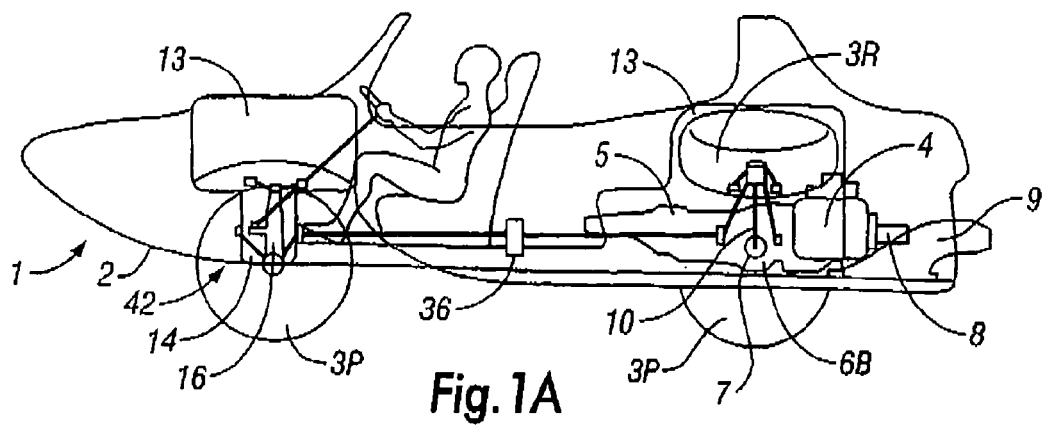
FIGS. 1A, 1B and 1C are respectively a side elevation, a plan view, and a rear elevation of an amphibious vehicle in accordance with the invention.
Figure 1B:
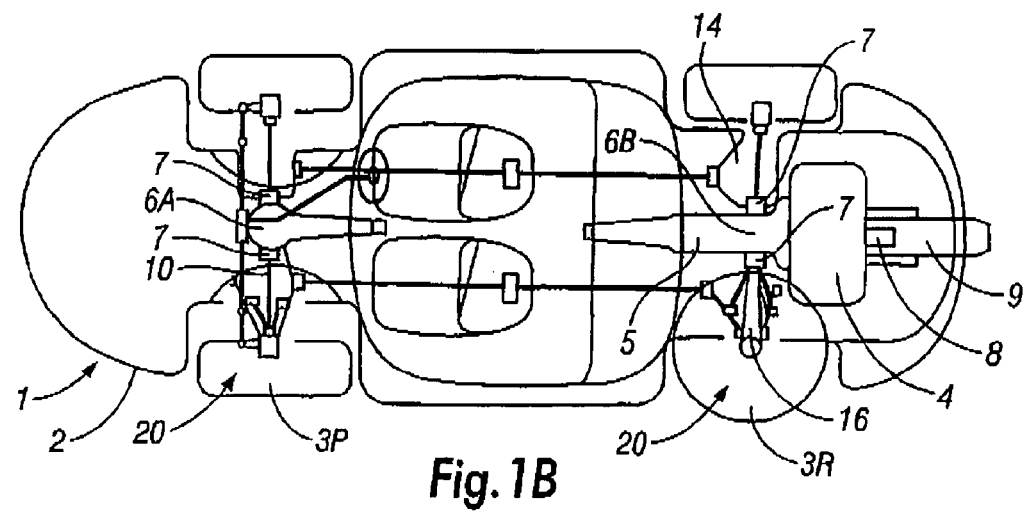
Figure 1C:
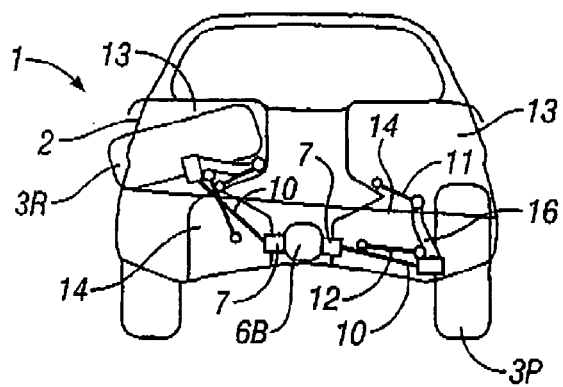

Referring to the drawings, in which like numerals have been used to denote common components throughout the several embodiment: FIGS. 1A, 1B and 1C show three views of an amphibious vehicle (generally indicated by arrow 1) comprising a body 2 being a buoyant vessel, having wheels 3 (indicated by 3P for the protracted position, and 3R for the retracted position). As shown this preferred embodiment has four wheels; however, other configurations, such as three wheels, or multiple wheels, are possible.

The vehicle includes a motor 4 or similar power-source to provide power through transmission 5 to differentials 6A (front) and 6B (rear), each having drive-outputs 7, as shown. The motor 4 also provides power through a gearbox 8 to a marine propulsion unit 9. Various combinations of motors, transmissions and propulsion units can be assembled however, without change to the principle of the invention. The essential functions of this invention would be suited to numerous configurations of land-water amphibious vehicles.

A wheel-retraction apparatus is generally indicated by arrow 20.

In this preferred embodiment, FIGS. 1A, 1B and 1C further show the drive-outputs 7 connected to the drive shafts 10, these being connected to the wheels 3P and 3R respectively which are located to the body 2 (at front and rear) by upper suspension linkages 11, and lower suspension linkages 12. These shafts and linkages operate in an upper compartment 13 and a lower compartment 14 for each of the wheels. From the three views of FIG. 1 it will be understood that each wheel may process from a lower (protracted) land-support position 3P to an upper (retracted) water-borne position 3R, wherein each wheel is largely enclosed within its respective compartment 13.

Figure 2:
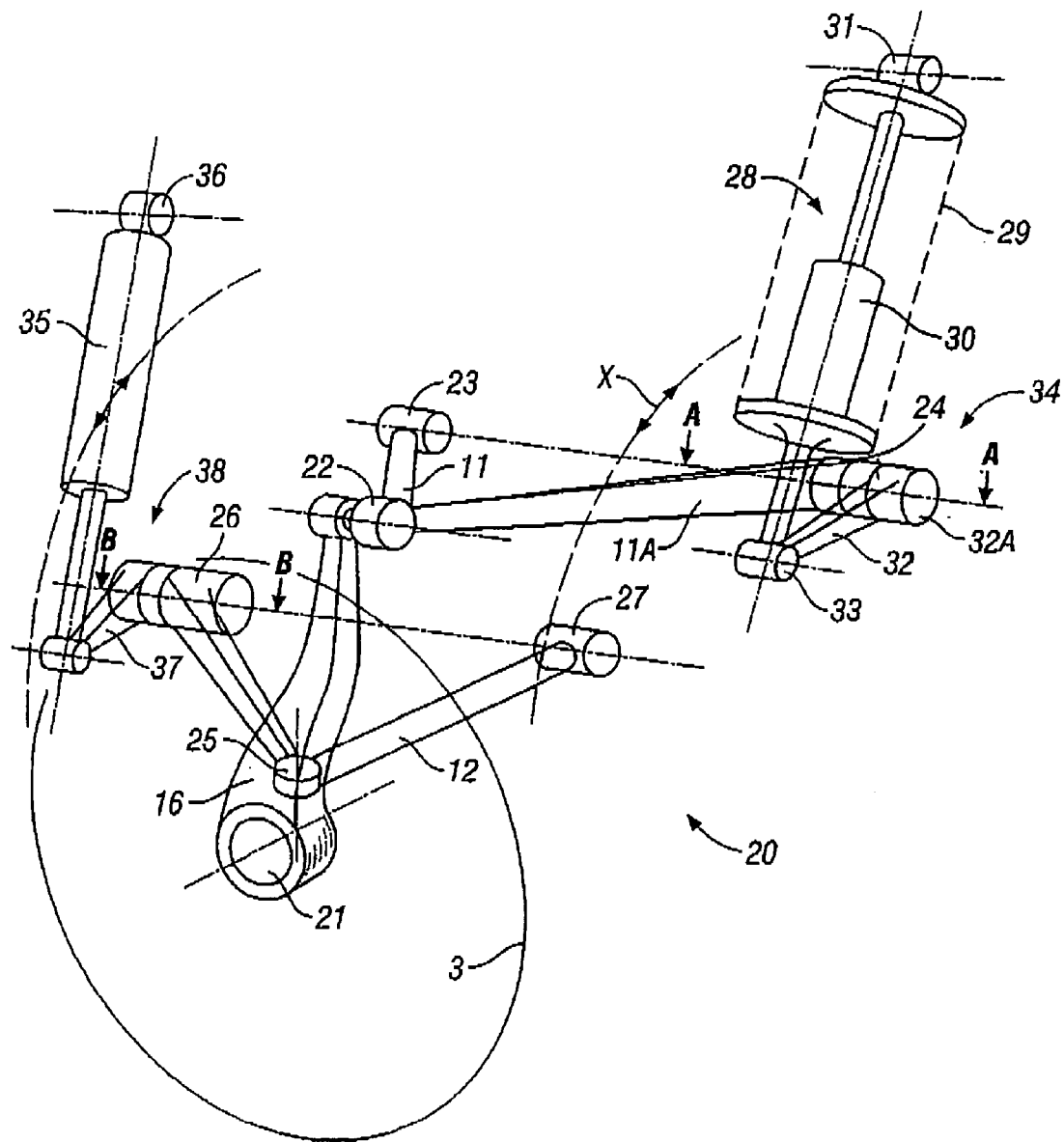
FIG. 2 is a perspective, somewhat schematic view of a wheel suspension and retraction apparatus of the amphibious vehicle of FIGS. 1A to 1C.

FIG. 2, shows in more detail a first embodiment of a wheel suspension and retraction apparatus 20 for an amphibious vehicle 1 in accordance with the invention. The apparatus comprises a wheel support 16 having an opening or housing 21 for receiving a constant velocity (CV) joint of a drive shaft 10 (not shown in FIG. 2) to which a wheel, shown in outline at 3, is mounted. In the case of a non-driven wheel, the wheel support may be in the form of a stub axle.

The wheel support is pivotably mounted to a frame of the body 2 of the vehicle (not shown in FIG. 2) by means of the upper 11 and lower 12 suspension linkages which are arranged in a wishbone configuration known in the automotive field. The upper wishbone 11 is pivotably connected to an upper end of the Wheel support 16 by means of an upper ball joint 22 and is pivotably connected to the vehicle body by means of upper, inboard pivots 23, 24. Similarly the lower wishbone 12 is pivotably connected to the wheel support 16 by means of a lower ball joint 25 and to the vehicle body by means of lower, inboard pivots 26, 27. The configuration of the upper and lower wishbones and the pivots enables the wheel to move between a protracted position and a retracted position along a trajectory indicated by line X.

A suspension means in the form of strut 28 is provided to absorb road shocks from the wheel when the vehicle is used on land. The strut 28 incorporates a coil spring, indicated schematically at 29, mounted about a telescopic hydraulic damper 30, in a manner well known in the automotive field. An upper end of the strut 28 is pivotably connected to the vehicle body by means of a pivot 31 whilst the lower end of the strut is mounted to an outer end of a suspension lever arm 32 by means of a further pivot 33. The inner end of the suspension lever arm 32 is connected to the vehicle body and to one of the arms 11A of the upper wishbone 11 through one of the inboard pivots 24 which connect the upper wishbone to the vehicle body. Apparatus, indicated generally at 34, interconnects the inner end 32A of the lever arm 32 and the upper wishbone 11 so as to permit the two to be operatively connected for use of the vehicle on land or operatively disconnected when the wheel is to be retracted for use of the vehicle on water.

Details of various embodiments of the apparatus 34, otherwise known as suspension disconnect apparatus, will be described in more detail below. However, in general the suspension disconnect apparatus 34 is constructed such that when the lever arm 32 and the upper wishbone 11 are operatively connected by the apparatus 34, torque is transmitted between the two but when the upper wishbone 11 and the lever arm 32 are disconnected, torque is not transmitted between the two.

The wheel suspension and retraction apparatus 20 also includes an actuator 35 for moving the wheel 3 between its protracted and retracted positions. In the present embodiment, the actuator is in the form of a double acting hydraulic ram, but other types of actuator could be used. For example, the actuator 35 could be a pneumatic ram or an electrically driven ram. One end of the ram 35 is connected to the vehicle body by means of a pivot 36 whilst the other end of the ram 35 is pivotably connected to a first end of a retraction lever arm 37. A second end of the retraction lever arm 37 is connected to the lower wishbone 12 via one of the inner pivots 26 which connect the lower wishbone to the vehicle body. In operation, the hydraulic ram 35 can be extended or retracted to apply a torque to the retraction lever arm 37 which in turn applies a torque to the lower wishbone 12 to move the wheel between the protracted and retracted positions.

Although it is not essential to the invention, it is preferable if the actuator 35 can be operatively disconnected from the lower wishbone 12, and hence the wheel 3, when the vehicle is used on land. By disconnecting the actuator 35 in this way, the suspension system is isolated from the actuator when the vehicle is used on land and the characteristics of the suspension system can be optimised for land and in particular road use. In order that the actuator 35 can be operatively disconnected from the lower wishbone 12, the retraction lever arm 37 is connected to the lower wishbone 12 by means of apparatus, indicated generally at 38, which is adapted to enable the retraction lever arm 37 and the lower wishbone to be operatively connected or disconnected. An embodiment of the apparatus 38, which is also known as a retraction disconnect apparatus, will be described in more detail below with reference to FIG. 6. However, the apparatus 38 could also be constructed so as to be the same as or similar to the apparatus 34 for interconnecting the suspension lever arm 32 and the upper wishbone 11.

Figure 5:
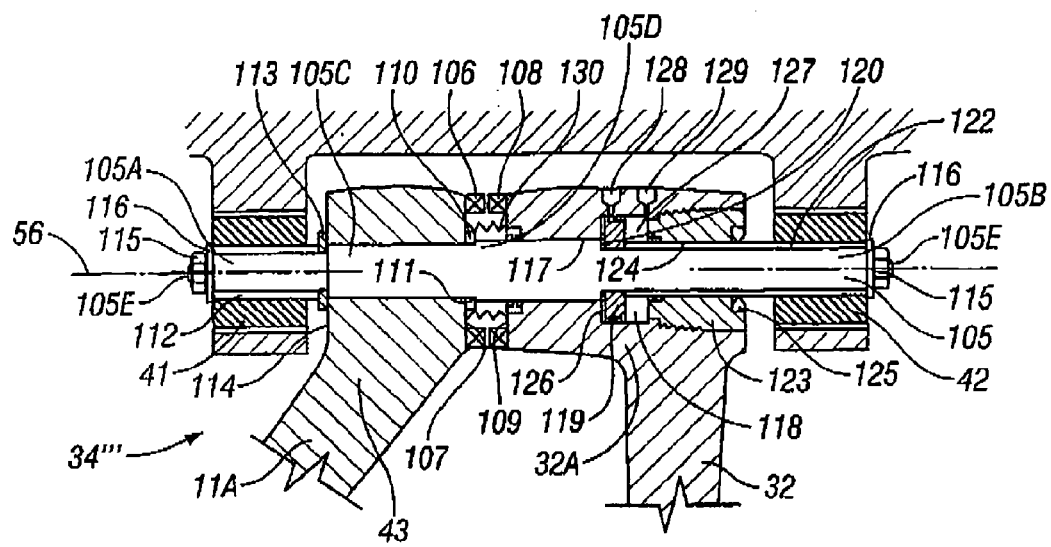
FIG. 5 is a view similar to that of FIG. 3 but showing a third embodiment of a suspension disconnect apparatus of the apparatus of FIG. 2.

There will now follow, with reference to FIGS. 3 to 5, a description of several different embodiments of the suspension disconnect apparatus 34 for interconnecting the suspension lever arm 32 and the upper wishbone 11. It will be appreciated that as indicated above, the arrangements described can be readily adapted for use in the retraction disconnect apparatus 38 interconnecting the retraction lever arm 37 with the lower wishbone 12. There will also follow with reference to FIG. 6, a description of a retraction disconnect apparatus 38 for interconnecting the retraction lever arm 37 and the lower wishbone 12. It should also be appreciated that the apparatus 38 could be adapted for use in interconnecting the suspension lever arm 32 with the upper wishbone 11.

A first embodiment of the apparatus 34 indicated generally at 34' is shown in FIG. 3. Part of the frame of the vehicle body is indicated at 39. The vehicle frame is provided with two housings 40 for receiving bushes 41, 42, to which an inner end 43 of one of the arms 11A of the upper wishbone 11 and the inner end 32A of the suspension lever arm 32 are respectively mounted. At least one housing 40 may be detachable from the frame 39 to facilitate assembly.

The inner end 43 of the upper wishbone arm 11A provides a housing 44 having a blind bore 45. A hollow circular boss 46 projects axially from the closed end of the housing 44 and is pivotably received in one of the bushes 41. The open end of the bore 45 has a slightly enlarged diameter portion 47 on which is seated a bearing 48 in abutment with a lip 49 between the enlarged diameter portion 47 and the remainder of the bore 45. The bearing 48 is held in position on the housing by a circlip 50. A number of ball receiving tracks 51 are formed in the bore 45 inwardly of the lip 49. The tracks 51 extend only over a partial region of the bore 45 for reasons which will be explained later.

The inner end or hub 32A of the suspension lever arm 32 has a generally "T" shaped cross section as shown in FIG. 3. On one axial end of the hub 32A is a first circular boss region 52 which is pivotably received within the other of the bushes 42 on the vehicle frame. The opposite end of the hub 32A is received within the housing 44 and has a second boss region 53, to which is mounted an inner race of the bearing 48. The inner race of the bearing 48 is held in position on the second boss region in abutment with an axial face 54 on the lever arm 32 by means of a further circlip 55. The arrangement of the bearing 48 and the circlips 50, 55 serves to locate the suspension lever arm 32 and the upper wishbone 11 axially relative to one another whilst permitting relative rotational movement between the two about the axis of rotation which is indicated at 56.

A bore 57 extends through the hub 32A. The bore has a first portion 58 which is splined to mate with splines 59 formed along part of the length of a shaft 60 slidably mounted in the bore 57. The bore 57 also has a second portion of enlarged diameter which is adapted to provided a hydraulic cylinder 62. The outer end of the cylinder is closed off by means of a cap member 63 which is in screw threaded engagement with the cylinder. The shaft 60 extends into the cylinder 62 and mounted to the end of the shaft 60 within the cylinder 62 is a piston 64. The piston 64 sealingly engages the surface of the cylinder 62 to divide the cylinder into two chambers 65, 66. A seal 67 in the cylinder 62 prevents hydraulic fluid within the chamber 65 from entering the first portion 58 of the bore 57 around the shaft 60. A first port 68 in the cap 63 communicates with the chamber 66 on one side of the piston 64, whilst a second port 69 communicates with the chamber 65 on the other side of the piston.

The end of the shaft 60 opposite from the piston 64 extends from the lever arm hub 32A into the housing 44 and has a knuckle 70. A number of steel balls 71 are disposed about the knuckle 69 and mall be retained on the knuckle by means of a cage (not shown). With the shaft 60 in the position shown in FIG. 3, the steel balls 71 are engaged in respective tracks 51 in the housing 44 and serve to transmit movement and forces between the housing 44 and the shaft 60. This arrangement is similar to that used in plunge type CV joints which will be familiar to those skilled in the art of automotive technology. Since the shaft 60 is splined to the suspension lever arm 32, torque can be transmitted between the lever arm 32 and the upper wishbone 11 through the splines 59, the knuckle 70, steel balls 71T and the tracks 51, such that the suspension strut 28 and the wheel 3 are operatively connected.

As mentioned above, the tracks 51 in the housing 44 extend only over part of length of the bore 45 such that an inner region 72 of the bore 45 has no tracks. The shaft 60 can be reciprocated axially within the bore 57 of the lever arm hub 32A to move the knuckle 70 and the steel balls 71 between the position shown in FIG. 3 and a position in which they lie within the inner, trackless region 72. In this position the steel balls are no longer engaged in the tracks 51 and hence do not act to transmit movement and forces between the housing 44 and the shaft 60. Since no forces can be transmitted between the lever arm 32 and the upper wishbone 11, the suspension means or strut 28 is operatively disconnected from the wheel 3.

Reciprocal movement of the shaft 60 is effected bad means of the piston 64 in the cylinder 62. By connecting the chamber 66 to a source of pressurised hydraulic fluid via the port 68 and connecting the chamber 65 to a hydraulic fluid reservoir via the port 69, the piston 64 and shaft 60 can be moved to the left (as viewed in FIG. 3) until the knuckle 70 and steel balls 71 are in region 72 of the bore 45 having no tracks and the lever arm 32 is operatively disconnected from the upper wishbone 11. This can be considered as a neutral stage in which the apparatus 34' is disengaged. By reversing the hydraulic connections to the chambers 65, 66, the piston and shaft can be moved to the right (as viewed) until the balls re-enter the tracks and the lever arm 32 is again operatively connected with the upper wishbone 11.

Whilst use of a hydraulic piston and cylinder actuator is the preferred means for reciprocating the shaft 60, this is not essential and any suitable means could be used. For example, a pneumatic, or electromagnetic actuator could be used to reciprocate the shaft 60.

A second embodiment of a suspension disconnect apparatus 34" for interconnecting the suspension lever arm 32 and the upper wishbone 11 is shown in FIG. 4. A shaft 80 is rotatably mounted between the two bushes 41, 42 on the vehicle frame. The inner end 43 of one of the arms 11A of the upper wishbone 11 and the suspension lever arm hub 32A are pivotably mounted to the shaft 80 between the bushes 41, 42 by means of bores 81, 82. Bearings 83, 84 are fitted about reduced diameter end portions 85, 86 of the shaft 80 where it extends through the bushes 41, 42. The bearings 83, 84 are held in position by nuts 87 and washers 88 mounted on threaded studs 80A projecting axially from the ends of the shaft 80. The bearings 83, 84 locate thrust washers 89, 90 on the shaft, holding them in contact with the axially outer end faces of the wishbone arm inner end 43 and the hub 32A. A further thrust washer 91 is located between the axially inner ends of the wishbone arm inner end 43 and the hub 32A. This arrangement locates the wishbone arm and the suspension lever arm aerially between the bushes 41, 42 whilst permitting them to rotate about the shaft relative to the vehicle body and, when disconnected, to each other.

Axially inner portions 92, 93 of the wishbone arm inner end 43 and the lever arm hub 32A have a reduced diameter and are formed with corresponding splines 92A, 93A. The splined portion 93 of the lever arm hub 32A is arranged to be about twice the length of the splined portion 92 on the wishbone arm. A sleeve 95 is provided about the splined portion 93 on the lever arm hub 32A and has corresponding splines 96 on an inner surface, as shown in the cross section in FIG. 4A, which drivingly engage with the splines 93A of the hub 32A. When the sleeve is in the position shown in FIG. 4, it is in engagement only with the splines 93A on the suspension lever arm hub 32A so that the upper wishbone 11 and the suspension lever arm 32 are free to rotate about the shaft 80 relative each other. Thus the suspension lever arm 32 is operatively disconnected from the upper wishbone 11.

When the splines 92A, 93A on the upper wishbone 11 and the suspension lever arm hub 32A are in alignment, the sleeve 95 can be moved to the left (as viewed) so that the splines 96 in the sleeve 95 engage partly with the splines 92A on the wishbone and partly with the splines 93A on the suspension lever arm hub 32A. In this position the collar 95 locks the upper wishbone arm 11A and the suspension lever arm 32 together so that torque can be transmitted between them, operatively connecting the wheel 3 to the suspension strut 29.

The term "spline" as used herein should be understood to encompass any suitable, elongate drive formations that would enable drive to be transmitted between the sleeve 95 and the inner, or drive, portions 92, 93 of the wishbone arm inner end and the lever arm hub 32, whilst enabling the sleeve to move axially relative to the drive portions. For example, the sleeve 95 and the drive portions 92, 93 could be provided with "splines" in the form of inter engaging gear teeth. Furthermore, whilst it is preferred that the sleeve 95 and the drive portions 92, 93 are provided with corresponding spline formations, any other suitable drive means can be provided between the sleeve 95 and the drive portions 92, 93. For example, the portions 92, 93 could have a non-circular profile, square or hexagonal for example, and the sleeve 95 can be provided with a correspondingly shaped bore such that torque can be transmitted between the sleeve and the drive portions 92, 93.

Reciprocal axial movement of the sleeve 95 to connect and disconnect the lever arm 32 and the upper wishbone 11 can be effected by any suitable means. In the present embodiment it is effected by means of a hydraulic actuator having a cylinder 97 and a piston 98 which divides the cylinder into two chambers 99, 100, one on either side of the piston. The piston is connected to the sleeve by a selector shaft 101 attached to a lug 102 on the sleeve 95 by means of a clevis pin 103. By appropriately connecting one or other of the chambers 99, 100 to a source of pressurised hydraulic fluid and the other chamber to a hydraulic fluid reservoir, the piston can be selectively moved to the left or right (as viewed) to connect and disconnect the suspension lever arm 32 and the upper wishbone 11 as required, thus engaging and disengaging the apparatus 34".

A third embodiment of the apparatus 34''' is shown in FIG. 5. A shaft 105 is rotatably mounted in the bushes 41. 42 on the vehicle frame. The inner end 43 of one of the arms 11A of the upper wishbone 11 and the hub 32A of the suspension lever arm 32 are pivotably mounted to the shaft 105 between the bushes 41, 42. A first set of drive teeth 106 are provided on an axially inner face 107 of the inner end 43 of the upper wishbone arm 11A and a corresponding set of drive teeth 108 are provided on an axially inner face 109 of the hub 32A of the suspension lever arm 32. The arrangement is such that the inner end 43 of the upper wishbone arm 11A is axially fixed relative to the shaft 105 whilst the hub 32A of the lever arm is adapted to slide reciprocally along the shaft so that the teeth 106, 108 can be brought into and out of engagement with each other to operatively connect the suspension lever arm 32 with or disconnect the suspension lever arm from, the wishbone arm 11A.

The shaft 105 has first and second regions 105A and 105B at either end which have a relatively small diameter and which are received in the bushes 41, 42. A third region 105C adjacent the first region 105A has a slightly enlarged diameter, whilst a fourth central region 105D between the third 105C and the second 105B regions has an even larger diameter.

The inner end 43 of the upper wishbone arm 11A is rotatably mounted about the third region 105C of the shaft 105 with its axially inner face 107 in contact with a thrust washer 110 which itself is in abutment with an axial face 111 formed between the third region 105C and the central, fourth region 105D of the shaft. The inner end 43 of the upper wishbone arm 11A is located axially on the shaft by means of a bearing 112 located about the first region 105A of the shaft. The axially inner end of the bearing 112 engages with a further thrust washer 113 to hold the thrust washer in contact with an axially outer face 114 of the inner end 43 of the upper wishbone arm 11A. The bearing 112 is secured to the shaft by means of a nut 115 and washer 116 mounted to a threaded stud portion 105E on the end of the shaft 105.

The hub 32A of the suspension lever arm 32 has a bore 117 which is adapted to be a sliding fit over the central, fourth region 105D of the shaft 105. An axially outer portion of the bore 117 is enlarged to form a cylinder 118 located about the second region 105B of the shaft. A piston 119 is mounted on the second region 105B of the shaft and is held in contact with an axial face 120 formed between the second and fourth regions 105B, 105D of the shaft by means of a further bearing 122. As with the bearing 121, the further bearing 122 is secured to the shaft 105 by a nut 115 and washer 116 mounted to a threaded stud portion 105E on the end of the shaft.

A closure member 123 is in threaded engagement with the enlarged diameter portion of the bore 117 in the lever arm hub 32A to close the cylinder 118. The closure member has an inner bore 124 which is a sliding fit about the bearing 122. Seals 125 are provided to seal between the closure member 123 and the bearing 122 to prevent hydraulic fluid leaking from the cylinder 118. The piston 119 divides the cylinder 118 into two chambers 126, 127 and ports 128, 129 are provided in the hub 32A to allow each of the chambers to be selectively connected to either a source of pressurised hydraulic fluid or to a hydraulic fluid reservoir.

FIG. 5 shows the apparatus 34''' with the suspension lever arm 32 and the upper wishbone arm 11A operatively disconnected, i.e. with the apparatus 34''' disengaged. In this position the lever arm 32 is at its extreme right hand (as viewed) position with the driving teeth 106, 108 disengaged so that the upper wishbone is able to pivot about the shaft 105 relative to the suspension lever arm 32. By connecting the chamber 126 to a source of pressurised hydraulic fluid and the chamber 127 to a hydraulic fluid reservoir the suspension lever arm 32 can be moved axially to the left (as viewed) along the shaft 105 to engage the drive teeth 106, 108 with each other. When the drive teeth 106, 108 are engaged they lock the upper suspension linkage 11 and the suspension lever arm 32 together for rotation about the shaft 105 and its axis 56. In this position torque can be transmitted between the upper wishbone 11 and the suspension lever arm 32, operatively connecting the suspension strut 28 to the wheel 3. The driving teeth can be disengaged by reversing the hydraulic connections to the chambers 128, 129 to move the suspension lever arm to the right (as viewed) to return it to the position shown in FIG. 5.

To ensure that the hub 32A is able to slide freely on the shaft 105, an elasticated or neoprene boot 130 can be provided between the hub 32A and the inner end 43 of the upper wishbone arm 11A to prevent water and dirt from coming into contact with the central, fourth region 105D of the shaft 105.

In this embodiment, the axial movement of the suspension lever arm must be accommodated by the suspension strut 28. To that end the strut 28 may be mounted to the lever arm and/or to the vehicle body using compliant bushes.

Figure 6:
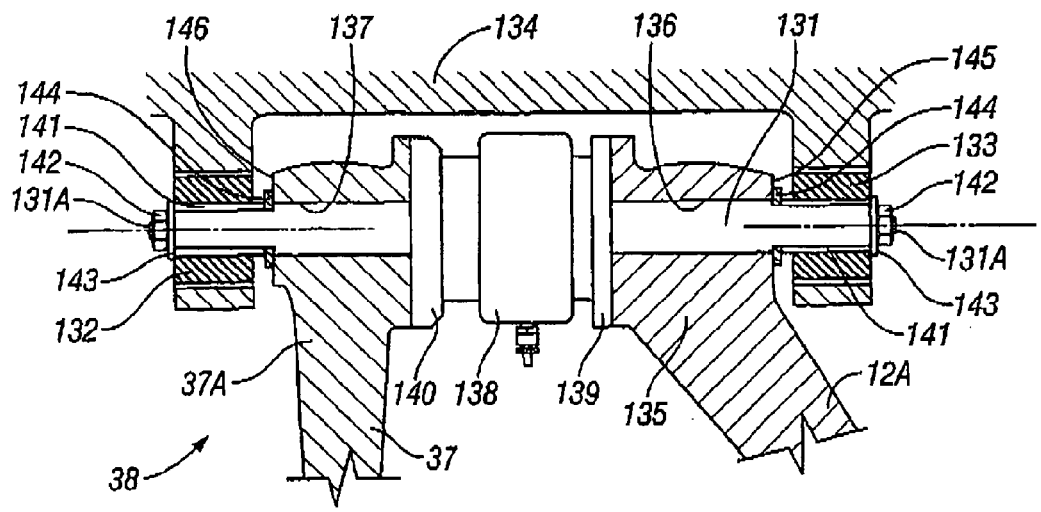
FIG. 6 is a cross-sectional view taken on line B-B of FIG. 2, showing a retraction disconnect apparatus of the wheel suspension and retraction apparatus of FIG. 2.

FIG. 6 shows an embodiment of a retraction disconnect apparatus 38 for interconnecting the retraction lever arm 37 and the lower wishbone 12. A shaft 131 is mounted between two bushes 132, 133 attached to a frame 134 of the vehicle body. An inner end 135 of one of the arms 12A of the lower wishbone and the inner end 37A of the retraction lever arm 37 are rotatably mounted to the shaft 131 between the bushes by means of bores 136, 137.

A clutch 138 is connected by means of flanges 139, 140 between the lower wishbone arm 12A and the retraction lever 37. The clutch is adapted to transmit torque between the lower wishbone arm 12A and the retraction lever arm 37 when it is engaged, to operatively connect the hydraulic retraction actuator 35 to the wheel 3. When the clutch 138 is disengaged, the lower wishbone arm 12A and the retraction lever arm 37 are free to pivot about the shaft 130 relative to each other.

Any suitable clutch 138 can be used provided it has sufficient capacity to transmit the forces required to move the wheel between the protracted and retracted positions. Since the detailed construction of the clutch 138 is not a feature of the present invention it will not be described. In a particularly preferred embodiment the clutch 138 is a pneumatic clutch such as model No. 5H30 which can be obtained from Nexen Group, Inc., 560, Oak Grove Parkway, Vadnais Heights, Minn. 55127, USA. This clutch requires 80 psi air pressure to an internal actuating piston and is rated to transmit 210 Nm.

The assembly of the inner ends 135, 37A of the lower wishbone arm 12A and the retraction lever arm 37 and the clutch 138 is axially located on the shaft by means of bearings 141 located about reduced diameter end portions of the shaft 130. The bearings 141 are secured to the shaft by nuts 142 and washers 143 mounted to threaded spigots 131A at the ends of the shaft and hold thrust washers 144 in contact with respective axial end faces 145, 146 of the lower wishbone arm 12A and the retraction lever arm 37.

It will be appreciated that the apparatus 38 described above could be adapted for use as apparatus 34 for connecting and disconnecting the suspension lever arm 32 and the upper wishbone 11 by incorporating a clutch capable of transmitting the suspension forces.

Operation of the suspension and retraction apparatus 20 when an amphibious vehicle enters and leaves the water will now be described.

As a vehicle approaches the water, the wheels 3 will be in the protracted position and the suspension disconnect apparatus 34 will be engaged so as to operatively connect the suspension strut 29 with the upper wishbone 11 and the wheel 3. Hence suspension loads will be transmitted between the wheel and the suspension strut through the wheel support 16, the upper ball joint 22, the upper wishbone 11, and the suspension lever arm 32. At this stage the retraction disconnect apparatus 38 is disengaged so that the retraction lever arm 37 is operatively disconnected from the lower wishbone 12.

As the vehicle enters the water, the load comes off the suspension and the wheel 3 droops. When the suspension is fully unloaded, the suspension disconnect apparatus 34 can be disengaged to operatively disconnect the suspension lever arm 32 from the upper wishbone 11. The retraction lever arm 37 can then be operatively connected to the lower wishbone 12 by engaging the apparatus 38, which in the present embodiment is the pneumatic clutch 138. The hydraulic actuator 35 can then be activated to move the wheel to the retracted position, with the suspension strut 28 remaining in the road use position.

Although in the embodiment described above, the apparatus 34 is disengaged to operatively disconnect the suspension lever arm 32 from the upper wishbone 11 before the retraction lever is connected to the lower wishbone 12, this need not be the case. In certain circumstances it may be desirable to connect the retraction lever arm 37 to the lower wishbone 12 before disconnecting the suspension lever arm 32 from the upper wishbone 11.

If required, means may be provided to prevent the suspension strut 28 from extending when the suspension lever arm 32 is disconnected from the upper wishbone 11. For example, a limiting rod may be provided or the length of the damper may be designed to prevent over extension of the strut.

When the vehicle is to leave the water, the above procedure is reversed. The hydraulic actuator 35 is extended to move the wheel to the protracted position. Once the wheel is fully extended the retraction lever arm 37 is disconnected from the lower wishbone 12 by disengaging apparatus 38 and the suspension lever arm 32 connected to the upper wishbone 11 by engaging the apparatus 34. Once the suspension means 28 has been reconnected to the wheel 3, the vehicle can be driven towards the land and out of the water.

In certain circumstances it mars be desirable to engage the apparatus 34 to reconnect the suspension lever arm 32 to the upper wishbone 11 before the apparatus 38 is disengaged. It may be advantageous for example, to use the retraction actuator 35 to ensure that the upper wishbone 11 and the suspension lever arm 32 are held in predetermined relative positions to enable the apparatus 34 to be engaged.

Figure 7:
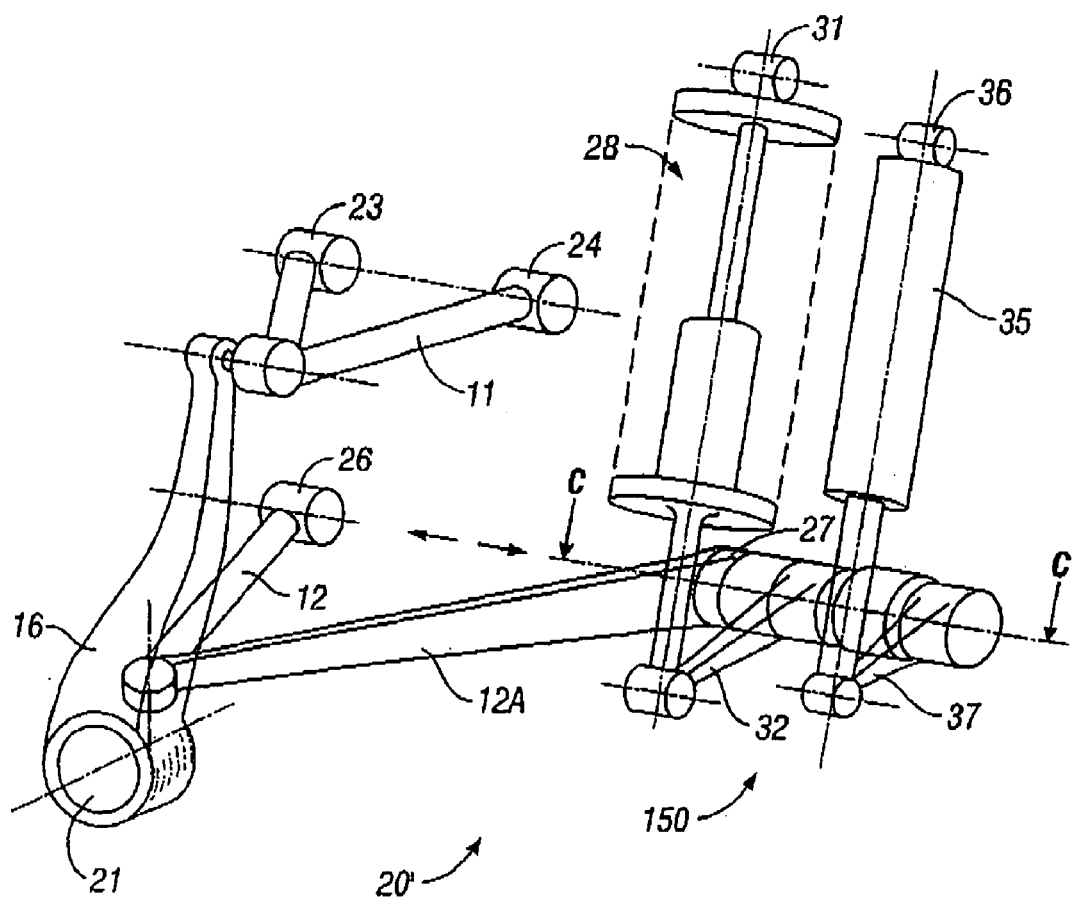
FIG. 7 is a perspective, somewhat schematic view of a further embodiment of a suspension and retraction apparatus of the amphibious vehicle of FIGS. 1A to 1C.

In the above described embodiment of the wheel suspension and retraction apparatus 20, the main suspension loads are taken between the upper wishbone 11 and the wheel support 16 via the upper ball joint 22. However, in order to allow the wheel 3 to be retracted and to also allow for steering movement it is necessary for the upper ball joint to be positioned horizontally. This arrangement may not be suitable for handling high suspension down forces. FIG. 7 shows a further embodiment of a wheel suspension and retraction apparatus 20' for an amphibious vehicle 1 in which this problem is avoided by connecting both the suspension means 28 and the retraction actuator 35 to the lower wishbone 12.

The apparatus 20' is similar to the apparatus 20 in that it comprises a wheel support 16 pivotally connected to the vehicle body by means of upper 11 and lower 12 wishbones. The apparatus 20' differs in that both the suspension strut 28 and the retraction actuator 35 are arranged to be selectively connectable to one of the arms 12A of the lower wishbone 12 by means of apparatus indicated generally at 150 which is incorporated into one of the inboard pivots 27 that connects the lower wishbone 12 to the vehicle body.

Figure 8:
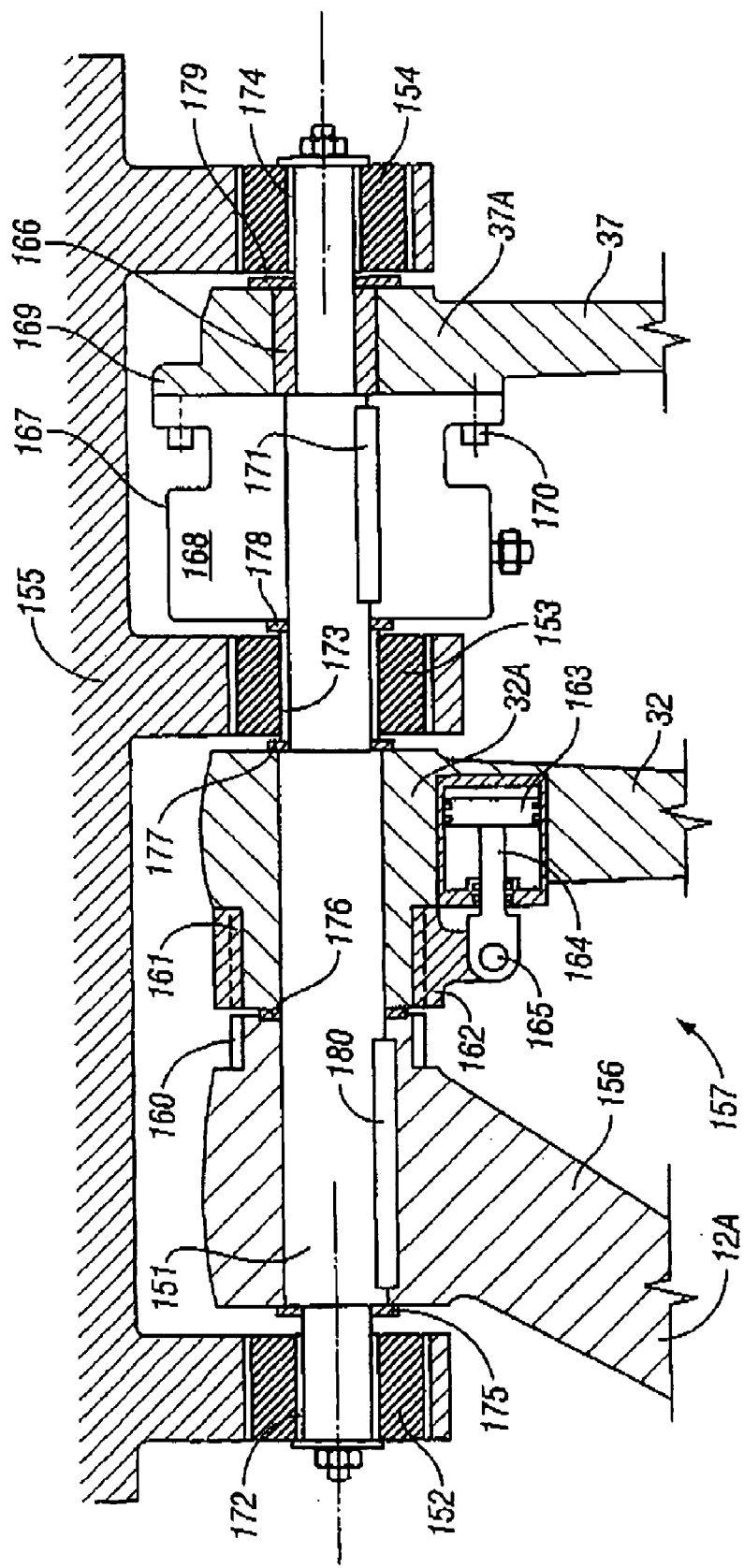
FIG. 8 is a cross-sectional view taken on line C-C of FIG. 7, showing co-axial suspension and retraction disconnect apparatus of the suspension and retraction apparatus of FIG. 7.

The apparatus 150 which effectively is a co-axial suspension and retraction disconnect apparatus, can be seen best in FIG. 8. A shaft 151 is rotatably mounted in three bushes 152-154 attached to a frame 155 of the vehicle body. The inner ends 156, 32A of one of the arms 12A of the lower wishbone 12, and of the suspension lever arm 32 respectively are mounted to the shaft between a first 152 and a second 153 of the bushes. The lower wishbone arm 12A is fixed rotationally fast with the shaft 151 by means of a key 180, whereas the inner end 32A of the suspension lever arm is able to rotate about the shaft. Suspension disconnect apparatus, indicated generally at 157, is provided to selectively lock the inner end 32A of the suspension lever arm to the inner end 156 of the lower wishbone arm 12A for rotation together about the shaft 151 and its axis 56.

In the present embodiment, the suspension disconnect 157 is similar to the apparatus 34" described above in relation to FIG. 4. To this end corresponding splines 160, 161 are provided on the lower wishbone arm 11 and the suspension lever arm 32 and an internally splined collar 162 is axially movable between the position shown in FIG. 8 in which it engages only with the splines 161 of the suspension lever arm 32, and a position in which it engages with the splines 160, 161 on both the suspension lever arm 32 and the lower wishbone arm 12A to lock the two together. Movement of the collar is effected by means of a hydraulic actuator 163 which is connected to the collar 162 by means of a selector shaft 164 and a clevis pin 165.

An inner end 37A of the retraction lever arm 37 is rotatably mounted to the shaft 151 between the second 153 and the third 154 of the bushes by means of a bearing 166. The housing 167 of a pneumatic clutch 168 is attached to a flange 169 on the retraction lever arm 37 by means of a series of bolts 170 so as to rotate with the lever arm 37. An output hub (not shown) of the clutch is fixed rotationally fast with the shaft 151 by means of a key 171 such that when the clutch 168 is engaged the inner end 37A of the retraction lever arm 37 is locked rotationally fast with the shaft 151.

Bearings 172-174 and thrust washers 175-179 serve to locate the inner end 156 of the lower wishbone arm 12A the inner end 32A of the suspension lever arm 32 the inner end 37A of the retraction lever arm 37 and the clutch 168 axially on the shaft 151.

Operation of the wheel suspension and retraction means 20' will now be described. When the vehicle is used on land pivotal movement of the lower wishbone 12 relative to the vehicle body due for example to the wheel 3 going over bumps in a road surface, is transmitted to the shaft 151 via the key 180. The suspension lever arm 32 is rotationally locked with the lower wishbone arm 12A by the splined collar 162 which is moved to the left (as viewed in FIG. 8) so as to engage with the splines 160, 161 on both the lower wishbone arm 12A and the suspension lever arm 32. Torque is therefore, transmitted between the suspension lever arm 32 and the lower wishbone 12 to operatively connect the suspension strut 28 with the lower wishbone 12 and hence the wheel 3. At this stage, the pneumatic clutch 168 is disengaged so that lever arm 37 can pivot about the shaft 151 to isolate the retraction actuator 35 from the lower wishbone 12.

When the vehicle enters the water, the mass of the vehicle is taken by the water reducing the load on the suspension and allowing the wheel 3 to droop. When the load on the suspension has been fully removed, the collar 162 is moved to the right (as viewed) to the position shown in FIG. 8 in which the splines in the collar are in engagement with the splines 161 on the suspension lesser arm 32 only. In this position, the suspension lever arm 32 is free to pivot about the shaft 151 relative to the lower wishbone arm 12 and the suspension strut 28 is operatively disconnected from the lower wishbone 12 and the wheel 3. To retract the wheel 3 the pneumatic clutch 168 is engaged locking the retraction lever arm 37 to the shaft 151. The hydraulic ram 35 can then be activated to pivot the retraction lever arm 37 turning the shaft 151 via the pneumatic clutch 168 and key 171. The lower wishbone 12, which is rotationally fast with the shaft 151 will then be pivoted upwardly relative to the vehicle body to move the wheel 3 to the retracted position. The pneumatic clutch 168 may be engaged either before or after the suspension lever arm 32 is disconnected from the lower wishbone 12 as required.

When the vehicle is to leave the water, the retraction actuator 35 is extended with the clutch 168 engaged so pivoting the lower wishbone downwardly relative to the vehicle body to move the wheel 3 to the protracted position.

When the wheel is fully lowered, the pneumatic clutch 168 can be disengaged and the suspension strut 28 re-connected by moving the splined collar 162 to the left (as viewed) to again lock the lower wishbone arm 12A and the suspension lever arm 32 together.

Depending on the specific design of the suspension arrangement, it may be possible for the clutch 168 to be disengaged when the wheel is in the fully retracted position without the wheel moving back to the protracted position. In such an arrangement, it will be necessary to re-engage the clutch 168 when it is desired to lower the wheel to the protracted position.

Whereas the invention has been described in relation to what is presently considered to be the most practical and preferred embodiments, it is to be understood that the invention is not limited to the disclosed arrangements but rather is intended to cover various modifications and equivalent constructions included within the spirit and scope of the invention. For example, the suspension means need not be a strut comprising a coil spring mounted about a telescopic hydraulic damper but could be of any suitable form. The suspension means could, for example, be in the form of a torsion bar and damper or a hydropneumatic suspension system. Furthermore, the retraction actuator need not be a double acting hydraulic ram but could comprise a pneumatic actuator, a screw driven actuator, or indeed any suitable form of actuator.

The invention claimed is:

1. An amphibious vehicle having a wheel mounted to a body of the vehicle so as to be movable from a protracted position, for use of the vehicle on land, to a retracted position, in which the wheel is stowed for use of the vehicle on water, the vehicle further comprising:
    a suspension means to absorb shocks from the wheel during land use
    a retraction means for moving the wheel between the protracted and retracted positions; and
    a suspension disconnect apparatus for allowing the suspension means to be operatively disconnected from the wheel when the wheel is to be retracted, wherein the wheel is mounted to the body of the vehicle by means of one or more suspension linkages and the suspension disconnect apparatus comprises an actuator for operatively connecting the suspension means to, or operatively disconnecting the suspension means from one of the suspension linkages.

2. An amphibious vehicle as claimed in claim 1, in which the retraction means can be operatively disconnected from the wheel when the wheel is in the protracted position.

3. An amphibious vehicle as claimed in claim 2, in which the wheel is mounted to the body of the vehicle by means of one or more suspension linkages, wherein the suspension disconnect apparatus operatively connects the suspension means to, or operatively disconnects the suspension means from, one of the suspension linkages.

4. An amphibious vehicle as claimed in claim 3, wherein the retraction disconnect means comprises a clutch.

5. An amphibious vehicle as claimed in claim 1, in which the actuator is a hydraulic actuator.

6. An amphibious vehicle as claimed in claim 1, in which the suspension means is operatively connected to one end of a suspension lever arm, the other end of the suspension lever arm being operatively connectable to said one of the suspension linkages by the suspension disconnect apparatus.

7. An amphibious vehicle as claimed in claim 6, in which the said one of the suspension linkages and the lever arm are mounted to the vehicle body for pivotal movement relative to the body about an axis, the suspension disconnect apparatus comprising means movable between a first position in which the said one of the suspension linkages and the suspension lever arm are locked so as to pivot together about the axis and a second position in which said one of the suspension linkages and the suspension lever arm are free to pivot about the axis relative to one another.

8. An amphibious vehicle as claimed in claim 7, in which the suspension disconnect apparatus comprises a bore in the said one of the suspension linkages or in the suspension lever arm, the bore having a number of ball receiving tracks formed over a part of its length, a shaft slidably mounted to the other of the said one of the suspension linkages or the suspension lever arm, the shaft projecting into the bore and having a knuckle about which are mounted a plurality of balls, the shaft being movable from a first position in which the balls are engaged in the tracks to lock the said one of the suspension linkages and the suspension lever arm together for pivotal movement about the axis and a second position in which the balls are not engaged in the tracks and the said one of the suspension linkages and the other end of the suspension lever arm are free to pivot about the axis relative to one another.

9. An amphibious vehicle as claimed in claim 8, in which the actuator is arranged to move the shaft between the first and second positions.

10. An amphibious vehicle as claimed in claim 9, in which the actuator reciprocates the shaft.

11. An amphibious vehicle as claimed in claim 7, in which the said one of the suspension linkages and the suspension lever arm have adjacent drive portions, the suspension disconnect apparatus further comprising a sleeve having drive means for cooperation with corresponding drive means on the drive portions, the sleeve being movable from a first position in which it is in driving cooperation with both of the drive portions to lock the said one of the suspension linkages and the suspension lever arm together for pivotal movement about the axis, and a second position in which it is in driving cooperation with only one of the drive portions such that the linkage and the arm are free to pivot about the axis relative to one another.

12. An amphibious vehicle as claimed in claim 11, in which the sleeve is internally splined for engagement with corresponding splines formed on the drive portions.

13. An amphibious vehicle as claimed in claim 11, in which a bore of the sleeve has a non-circular cross section for driving engagement with correspondingly shaped profiles on the drive portions.

14. An amphibious vehicle as claimed in claim 11, in which the actuator arranged to move the sleeve between the first and second positions.

15. An amphibious vehicle as claimed in claim 14, in which the actuator reciprocates a shaft.

16. An amphibious vehicle as claimed in claim 7, in which the said one of the suspension linkages and the suspension lever arm have corresponding drive teeth, the suspension lever arm being movable between a first position in which the drive teeth are engaged so as to lock the said one of the suspension linkages and the suspension lever arm together for pivotal movement about the axis, and a second position in which the drive teeth are disengaged such that the said one of the suspension linkages and the suspension lever arm are free to pivot about the axis relative to one another.

17. An amphibious vehicle as claimed in claim 16, in which the actuator is arranged to move the suspension lever arm between the first and second positions.

18. An amphibious vehicle as claimed in claim 17, in which the actuator reciprocates the suspension lever.

19. An amphibious vehicle as claimed in claim 1, in which the vehicle further comprises a retraction disconnect apparatus for operatively connecting the retraction means to, or operatively disconnecting the retraction means from, one of the suspension linkages.

20. An amphibious vehicle as claimed in claim 19, in which the retraction means comprises a retraction actuator operatively connected to one end of a retraction lever arm, the other end of the retraction lever arm being operatively connectable to said one of the suspension linkages through the retraction disconnect apparatus.

21. An amphibious vehicle as claimed in claim 20, in which the said one of the suspension linkages and the retraction lever arm are mounted to the vehicle body for pivotal movement relative to the vehicle body about an axis, the retraction disconnect apparatus comprising means for locking the said one of the suspension linkages and the retraction lever arm together for pivotal movement about the axis.

22. An amphibious vehicle as claimed in claim 21, in which the retraction disconnect apparatus comprises a pneumatic clutch.

23. An amphibious vehicle as claimed in claim 22, in which the clutch inter-connects the said one of the suspension linkages and the retraction lever arm such that when the clutch is engaged the said one of the suspension linkages and the retraction lever arm are locked together for pivotal movement about the axis and that when the clutch is disengaged, the said one of the suspension linkages and the retraction lever arm are free to rotate about the axis relative to one another.

24. An amphibious vehicle as claimed in claim 22, in which the said one of the suspension linkages is rotationally fast with a shaft, the pneumatic clutch having a first component which is also rotationally fast with the shaft and a second component attached so as to be rotationally fast with the retraction lever arm, the clutch being adapted such that when it is engaged the first and second components are rotationally fast so as to lock the said one of the suspension linkages and the retraction lever arm together for pivotal movement about the axis.

25. An amphibious vehicle as claimed in claim 1, in which the wheel is connected to the vehicle body by an upper suspension linkage and a lower suspension linkage.

26. An amphibious vehicle as claimed in claim 25, in which the suspension means is connectable to the upper suspension linkage.

27. An amphibious vehicle as claimed in claim 25, in which the suspension means is connectable to the lower suspension linkage.

28. An amphibious vehicle as claimed in claim 26 or claim 27, in which the retraction means is connectable to the lower suspension linkage.

29. An amphibious vehicle as claimed in claim 1, in which the suspension means comprises a strut having a coil spring mounted about a telescopic hydraulic damper.

30. An amphibious vehicle as claimed in claim 1, in which the retraction means comprises a double acting fluid ram.

31. An amphibious vehicle as claimed in claim 1, in which the retraction means comprises an electrically driven ram.

32. An amphibious vehicle having a wheel mounted to a body of the vehicle so as to be movable from a protracted position, for use of the vehicle on land, to a retracted position, in which the wheel is stowed for use of the vehicle on water, the vehicle further comprising:
- a suspension means to absorb shocks from the wheel during land use; and
- a retraction means for moving the wheel between the protracted and retracted positions,
- wherein the suspension means can be operatively disconnected from the wheel when the wheel is to be retracted and, the retraction means is selectively connected to the wheel by retraction disconnect means movable by way of retraction disconnect actuator between a first condition in which the disconnect means is engaged between the retraction means and the wheel and a second condition in which the retraction means is operatively disconnected from the wheel.

* * * * *

UNITED STATES PATENT AND TRADEMARK OFFICE
CERTIFICATE OF CORRECTION

| | | |
|---|---|---|
| PATENT NO. | : 7,311,568 B2 | |
| APPLICATION NO. | : 10/526726 | |
| DATED | : December 25, 2007 | |
| INVENTOR(S) | : Alan Timothy Gibbs | |

It is certified that error appears in the above-identified patent and that said Letters Patent is hereby corrected as shown below:

Column 4, Line 33; After "invention" delete ":" and insert -- ; --, therefor.
Column 4, line 54; After "1C" delete "," and insert -- ; --, therefor.
Column 5, line 2; After "shown" insert -- , --.
Column 5, Line 20 (Approx.); After "respectively" insert -- , --.
Column 5, Line 43 (Approx.); Delete "Wheel" and insert -- wheel --, therefor.
Column 6, Line 53; After "that" insert -- , --.
Column 6, Line 55; After "38" insert -- , --.
Column 7, Line 28; After "another" insert -- , --.
Column 7, Line 51; Delete "mall" and insert -- may --, therefor.
Column 7, Line 61; Delete "71T" and insert -- 71 --, therefor.
Column 8, line 10; Delete "bad" and insert -- by -- , therefor.
Column 8, Line 47; Delete "aerially" and insert -- axially --, therefor.
Column 9, Line 41; Delete "41." and insert -- 41, --, therefor.
Column 9, Line 51; After "105" insert -- , --.
Column 9, Line 55; After "with" insert -- , --.
Column 10, Line 42; After "reservoir" insert -- , --.
Column 11, Line 15; After "used" insert -- , --.
Column 11, Line 19; After "invention" insert -- , --.
Column 12, Line 21; Delete "mars" and insert -- may --, therefor.
Column 12, Line 24; After "advantageous" insert -- , --.
Column 12, Line 50; After "150" insert -- , --.
Column 13, Line 19; After "engaged" insert -- , --.
Column 13, Line 22; After "12A" insert -- , --.
Column 13, Line 23; After "32" insert -- , --.
Column 13, Line 29; After "body" insert -- , --.
Column 13, Line 36; After "is" insert -- , --.
Column 13, Line 49; Delete "lesser" and insert -- lever --, therefor.
Column 13, Line 53; After "3" insert -- , --.

UNITED STATES PATENT AND TRADEMARK OFFICE
CERTIFICATE OF CORRECTION

PATENT NO. : 7,311,568 B2
APPLICATION NO. : 10/526726
DATED : December 25, 2007
INVENTOR(S) : Alan Timothy Gibbs It is certified that error appears in the above-identified patent and that said Letters Patent is hereby corrected as shown below:

Column 14, Line 34 (Approx.); In Claim 1, after "use" insert -- ; --.
Column 15, Line 51 (Approx.); In Claim 14, after "actuator" insert -- is --.

Signed and Sealed this

Third Day of June, 2008

JON W. DUDAS
*Director of the United States Patent and Trademark Office*